US011873963B2

(12) United States Patent
Fu et al.

(10) Patent No.: US 11,873,963 B2

(45) Date of Patent: Jan. 16, 2024

(54) LIGHT SOURCE DEVICE AND LAMP

(71) Applicant: YLX Incorporated, Shenzhen (CN)

(72) Inventors: Jinjiang Fu, Shenzhen (CN); Bin Chen, Shenzhen (CN); Ru Jiang, Shenzhen (CN); Yong Ma, Shenzhen (CN)

(73) Assignee: YLX Incorporated, Shenzhen (CN)

( * ) Notice: Subject to any disclaimer, the term of this patent is extended or adjusted under 35 U.S.C. 154(b) by 0 days.

(21) Appl. No.: 17/766,134

(22) PCT Filed: Aug. 5, 2020

(86) PCT No.: PCT/CN2020/106971

§ 371 (c)(1),
(2) Date: Apr. 1, 2022

(87) PCT Pub. No.: WO2021/082585

PCT Pub. Date: May 6, 2021

(65) Prior Publication Data

US 2022/0381414 A1 Dec. 1, 2022

(30) Foreign Application Priority Data

Oct. 28, 2019 (CN) ........................ 201911030680.0

(51) Int. Cl.

*F21S 43/237* (2018.01)
*F21S 41/16* (2018.01)

(Continued)

(52) U.S. Cl.

CPC ........... *F21S 43/237* (2018.01); *F21S 41/141* (2018.01); *F21S 41/16* (2018.01); *F21S 41/37* (2018.01);

(Continued)

(58) Field of Classification Search

CPC ........ F21S 43/237; F21S 41/141; F21S 41/16; F21S 41/37; F21S 45/43; F21Y 2115/10; F21Y 2115/30

See application file for complete search history.

(56) References Cited

U.S. PATENT DOCUMENTS

| | | | |
|---|---|---|---|
| 4,533,209 | A | 8/1985 | Segerson et al. |
| 2002/0075674 | A1 | 6/2002 | Tufte |

(Continued)

FOREIGN PATENT DOCUMENTS

| | | |
|---|---|---|
| AU | 2018100858 | 7/2018 |
| CN | 202328024 | 7/2012 |

(Continued)

OTHER PUBLICATIONS

International Search Report for corresponding International Application PCT/CN2020/106971, dated Oct. 30, 2020.

Extended European Search Report issued in corresponding EP Application 20881112.5, dated May 23, 2023, 10 pages.

*Primary Examiner* — Thomas M Sember

(74) *Attorney, Agent, or Firm* — Burris Law, PLLC

(57) ABSTRACT

Provided is a light source device, including: a light-emitting chip arranged on a base plate and configured to emit first light; a light guide rod including first and second light guide portions, the first light guide portion including a light incident end surface, the first light entering the light guide rod through the light incident end surface and being transmitted to the second light guide portion after passing through the first light guide portion, and the second light guide portion including a light-outputting surface for outputting light; a first positioning member including a first groove for accommodating the light guide rod, being directly or indirectly fixed relative to the base plate; and a movable fixing assembly configured to fix, together with the groove of the first positioning member, the light guide rod (Continued)

along a radial direction of the light guide rod, and deforms when fixing the light guide rod.

19 Claims, 3 Drawing Sheets

(51) Int. Cl.

| | |
|---|---|
| ***F21S 41/37*** | (2018.01) |
| ***F21S 45/43*** | (2018.01) |
| ***F21S 41/141*** | (2018.01) |
| ***F21V 17/10*** | (2006.01) |
| ***F21Y 115/30*** | (2016.01) |
| ***F21Y 115/10*** | (2016.01) |

(52) U.S. Cl.
CPC ............ *F21S 45/43* (2018.01); *F21V 17/101* (2013.01); *F21Y 2115/10* (2016.08); *F21Y 2115/30* (2016.08)

(56) References Cited

U.S. PATENT DOCUMENTS

| | | | | |
|---|---|---|---|---|
| 2017/0122518 | A1 | 5/2017 | Landcastle et al. | |
| 2017/0122532 | A1* | 5/2017 | Zhang .................. | G02B 6/0006 |
| 2017/0284624 | A1* | 10/2017 | Gloss .................... | F21S 43/243 |
| 2018/0266646 | A1* | 9/2018 | Sanchez .................. | F21V 29/60 |

FOREIGN PATENT DOCUMENTS

| | | |
|---|---|---|
| CN | 104964228 | 10/2015 |
| CN | 109812777 | 5/2019 |
| CN | 208886535 | 5/2019 |
| CN | 110285383 | 9/2019 |
| CN | 209340975 | 9/2019 |
| EP | 2876473 | 5/2015 |
| EP | 3875838 | 9/2021 |
| JP | 2016162594 | 9/2016 |

* cited by examiner

LIGHT SOURCE DEVICE AND LAMP

CROSS-REFERENCE TO RELATED APPLICATIONS

This application is a national phase of International Application No. PCT/CN2020/106971, filed on Aug. 5, 2020, which claims priority to and the benefit of Chinese Application Number 201911030680.0 filed on Oct. 28, 2019. The disclosures of the above applications are incorporated herein by reference.

FIELD

The present disclosure relates to the field of light technology, in particular to a light source device and a lamp.

BACKGROUND

The statements in this section merely provide background information related to the present disclosure and may not constitute prior art.

Lamps on vehicles are an important factor that affects the driving safety of vehicles. The development of the automobile industry puts forward higher and higher requirements for vehicle lamps. Since light-emitting diode (LED) lamps began to replace halogen lamps on a large scale and entered the pre-installation market, the market for halogen filament bulbs has gradually shrunk. This alternation of the new and old technologies has brought the problem of the supply of spare parts in the stock market. Generally, as a durable product, an automobile usually has a life span of more than 10 years, and halogen filament bulbs usually have a brightness degradation after 3-5 years of use, thereby affecting the safety of driving at night. The optical architectures of LED car lamps and halogen lamps in the pre-installation market are very different, and it is impossible to directly replace the halogen filament with the LED light-emitting chip. Thus, an LED bulb occurs in the market to simulate the structure of the halogen bulb, and an LED chip of the LED bulb is arranged at a position of the luminous point of the halogen bulb filament to simulate the luminescence of the halogen bulb. However, the light-emitting angle of such LED bulb is affected by a backplane where the LED chip is located, and it is impossible for such LED bulb to perfectly simulate the light form of the halogen bulb. Meanwhile, there is a serious problem of heat dissipation, and it is difficult to achieve a sufficiently high brightness.

Therefore, researchers are studying a light source structure that combines LEDs and light guide rods to achieve a light form that simulates the light form of the halogen filament. Specifically, the LED chip is arranged at the bottom of the bulb, and light emitted from the LED chip is guided to the light-exiting portion of the light guide rod by the light guide rod and then is outputted. This technical solution separates the light source that provides light from the light guide for light shaping, and is unlike an integrated structure of the halogen filament bulb or the LED bulb in the market, therefore, there are optical problems, thermal problems, and structural stability problems when combining the LED chip and the light guide rod. Especially in the field of automotive lighting applications, on the one hand, the bulb is in a vibrating environment, and the separated structure of the light source and the light guide rod has poor stability; and on the other hand, automotive lighting has very high requirements for light distribution, and changes of the position of the light guide rod will cause a huge impact on the light distribution of the automotive lighting. Therefore, there is an urgent need for a stable bulb structure.

SUMMARY

This section provides a general summary of the disclosure and is not a comprehensive disclosure of its full scope or all of its features.

In view of the structural stability problem of the above new type of LED bulb with the light guide rod in the related art, the present disclosure claims a light source device, the light source device includes: a light-emitting chip arranged on a base plate and configured to emit first light; a light guide rod including a first light guide portion and a second light guide portion, the first light guide portion including a light incident end surface, the first light entering the light guide rod through the light incident end surface and being transmitted to the second light guide portion after passing through the first light guide portion, and the second light guide portion including a light-outputting surface for outputting light; a first positioning member including a groove for accommodating the light guide rod, where the first positioning member is directly or indirectly fixed relative to the base plate; and a movable fixing assembly configured to fix the light guide rod along a radial direction of the light guide rod together with the groove of the first positioning member, the movable fixing assembly being deformed when fixing the light guide rod.

Compared with the related art, the present disclosure includes the following beneficial effects: on the one hand, the first positioning member and the base plate of the light-emitting chip are fixed relative to each other; on the other hand, the light guide rod is limited and accommodated in the groove of the first positioning member in such a manner that the light-emitting chip and the light guide rod are relatively fixed relative to each other along the radial direction of the light guide rod while the movable fixing assembly is squeezed to deform, and the light guide rod is fixed in the groove of the first positioning member, thereby avoiding a sliding of the light guide rod along its axial direction, and thus obtaining a light source device with stable structure.

In an embodiment, the light guide rod is a solid light guide rod, and the movable fixing assembly includes an isolation layer, an elastic layer, and a rigid layer that are sequentially arranged outwards along the radial direction of the light guide rod, where the isolation layer is a light reflective layer. With such technical solution, it avoids that the elastic layer is in direct contact with the light guide rod. The isolation layer that is the light reflective layer is in contact with the light guide rod in such a manner that light reaching a side surface of the light guide rod will not be leaked due to not satisfying the total reflection condition. Meanwhile, the rigid layer squeezes the elastic layer, which can ensure that a uniform force and a uniform deformation are applied on the elastic layer, thereby avoiding sliding of the light guide rod.

In an embodiment, the isolation layer is a steel sheet, an aluminum sheet, a metal paper, or a metal layer.

In an embodiment, the elastic layer is made of silica gel, rubber, or plastic.

In an embodiment, one of the first positioning member and the base plate includes a positioning post, and the other one of the first positioning member and the base plate includes a positioning hole that correspond to the positioning post; and the first positioning member and the base plate are fixed relative to each other through the first positioning post and the positioning hole in such a manner that the light-emitting chip and the light guide rod are fixed relative to each other along a direction parallel to a light-emitting surface of the light-emitting chip.

In an embodiment, the light source device further includes a protective pad provided on the base plate, the protective pad is arranged at a periphery of the light-emitting chip, a height of the protective pad relative to the base plate is greater than a height of the light-emitting chip relative to the base plate, and the light incident end surface of the light guide rod is in contact with the protective pad. With such technical solution, it avoids that the light guide rod is in direct contact with the light-emitting chip, and a technical solution that reduces a distance between the light guide rod and the light-emitting chip as much as possible is provided, which, on the one hand, a structural stability problem caused by a direct thermal contact between the light-emitting chip and the light guide rod and a mismatch between their coefficients of thermal expansion can be solved, and on the other hand, a coupling efficiency of light emitted by the light-emitting chip entering the light guide rod is improved.

In an embodiment, the light guide rod and the protective pad are connected to each other by glue. With such technical solution, a pull force is applied on the light guide rod by the glue along the radial direction, thereby improving the position stability of the light guide rod along the radial direction.

In an embodiment, the glue has a curing temperature ranging from 60° C. to 100° C. With such technical solution, the glue is selected in such a manner that the glue is cured by lighting of the light-emitting chip, thereby simplifying the manufacturing process and saving cost because no heating and curing device needs to be provided.

In an embodiment, the protective pad is a ceramic pad. The ceramic pad has a substantially same thermal expansion and mechanical property to the light guide rod and the base plate where the light-emitting chip is located, and has a good compatibility. The ceramic pad is easy to process and easily to be rubbed smoothly.

In an embodiment, a long side of a cross section of the protective pad is arranged close to the light-emitting chip. With such technical solution, a contact area between the light guide rod and the protective pad is increased as much as possible. An adhering area will be relatively large when realizing adhere using the glue, thereby improving the combination stability. When the cross section of the protective pad has a shape of rectangle, the long side is a long side of the rectangle. When the protective pad has an irregular shape, the long side is a long side of a minimum enclosing rectangle of the protective pad.

In an embodiment, only an air gap is formed between the light-emitting chip and the light incident end surface, and the air gap is not larger than 0.05 mm. Since no collecting lens is provided between the light-emitting chip and the light incident end surface, it avoids that the light spot expands when reducing a divergent angle. The collecting efficiency of light emitted by the light-emitting chip is improved through reducing a distance between the light-emitting chip and the light incident end surface.

In an embodiment, the first positioning member further includes a through hole through which the light guide rod passes.

In an embodiment, the light source device further includes a heat dissipation assembly disposed on a back of the base plate, and the heat dissipation assembly includes a fan and heat dissipation fins surrounding the fan.

The present disclosure also claims a lamp including a chuck and the light source device described in any one of the above embodiments. The chuck is configured to be assembled and connected to a lamp housing. The light source device and the chuck are assembled and connected to each other through the first positioning member. The technical solution improves the installation flexibility of the lamp, and the light source device can be used as an independent module to be installed in any suitable lamp via the chuck, thereby being beneficial to cost saving and mass production.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
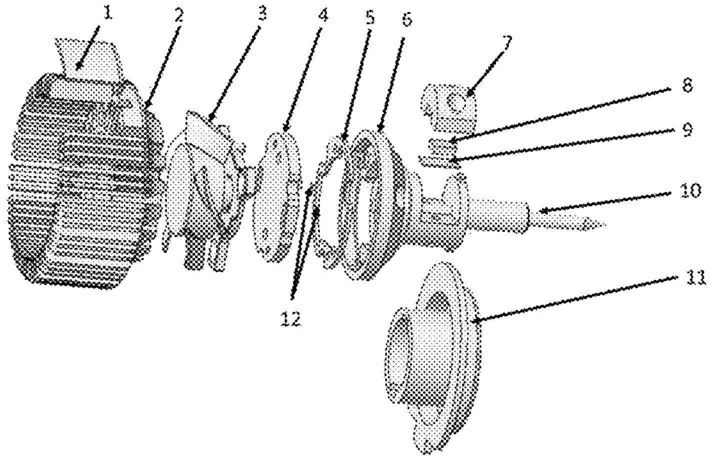
FIG. 1 is an exploded view of a light source device of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The embodiments of the present disclosure will be described in detail below in conjunction with the drawings and embodiments.

FIG. 1 is an exploded view of a light source device of the present disclosure. Referring to FIG. 1, the light source device mainly includes a crimping plate 1, a heat radiator 2, a fan 3, a base plate 4 (a light-emitting chip being arranged on the base plate 4, it is blocked at this angle, and a protective pad 12 being arranged on the base plate 4), a sealing pad 5, a first positioning member 6, a movable fixing assembly (including a rigid layer 7, an elastic layer 8, and an isolation layer 9), a light guide rod 10, and a chuck 11.

From an aspect of the light path, the light-emitting chip on the base plate 4 emits first light, the first light enters the light guide rod 10 and then is outputted from a light-outputting surface of the light guide rod 10 to form an illumination light distribution.

From an aspect of the structure, the base plate 4 is installed on a front surface of the heat radiator 2 by a connecting fastening element, and the fan 3 is installed on a back surface of the heat radiator 2 and is located inside an annular space defined by the heat dissipation fins of the heat radiator. The protective pad 12 is adhered to the base plate 4, and the light guide rod 10 and the movable fixing assembly are installed to the first positioning member 6. The sealing pad 5 is installed between the heat radiator 2 and the first positioning member 6 to act as a seal. The chuck 11 is connected to the first positioning member 6 and is configured to be connected to an external structure of a lamp.

The following will describe the modules in detail.

<Light-Emitting Chip>

The light-emitting chip is arranged on the base plate 4 and configured to emit the first light. The light-emitting chip can be a light-emitting diode LED or a laser diode LD. The light-emitting chip provides original illumination light of the light source device, and is also a first heat source of the light source device. Therefore, both the coupling efficiency of exiting light of the light-emitting chip and the heat dissipation of the light-emitting chip should be considered.

<Light Guide Rod 10>

Figure 2:
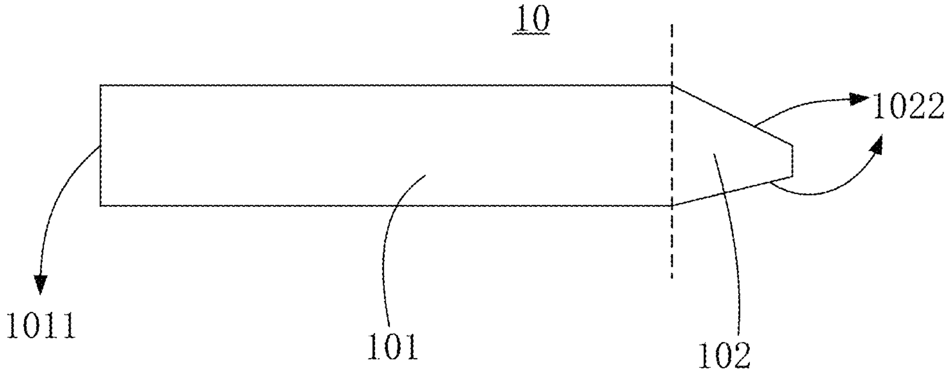
FIG. 2 is a schematic diagram of a light guide rod of a light source device of the present disclosure.

FIG. 2 is a schematic diagram of a light guide rod of a light source device of the present disclosure. Referring to FIG. 2, the light guide rod 10 includes a first light guide portion 101 and a second light guide portion 102 (separated by a dotted line as shown in the figure), and the first light guide portion 101 and the second light guide portion 102 can be two physically separated light guide structures (which can be bonded together by an adhesive), or can be two artificially divided areas of a light guide rod according to different functions. Essentially, the first light guide portion 101 and the second light guide portion 102 have different functions. The first light guide portion 101 is configured to guide incident light to the second light guide portion 102, and the second light guide portion 102 is configured to guide light to exit.

Specifically, the first light guide portion 101 includes a light incident end surface 1011. The first light enters the light guide rod 10 through the light incident end surface 1011, and reaches the second light guide portion 102 after being continuously reflected. The second light guide portion 102 has cross-sectional areas continuously reducing along a direction of an optical axis, thereby forming a side surface that is inclined with respect to the optical axis of the light guide rod 10, that is, a light-outputting surface 1022, so that light can exit from the side surface.

In the present disclosure, the light guide rod is preferably a solid light guide rod, and the light is transmitted in the light guide rod through total internal reflection. The solid light guide rod can be a glass rod, a quartz rod, a ceramic rod, etc. The solid light guide rod can have a relatively high refractive index, to ensure total internal reflection of light.

In an embodiment, the light-emitting chip emits white light, and the inclined light-outputting surface 1022 of the second light guide portion 102 is provided with a diffuse reflection structure, so that the white light exits through the side surface. In other embodiments of the present disclosure, the light-emitting chip can also emit light with other colors. For example, in an embodiment, the light-emitting chip is a blue LD, and the light-outputting surface of the second light guide portion is provided with yellow fluorescent material configured to absorb part of blue light and emit yellow light, so that unabsorbed blue light and the emitted yellow light are mixed to form the white light.

<Radial Fixation of Light Guide Rod>

The optical structure of a combination of the light-emitting chip and light guide rod of the present disclosure is to simulate a filament, and the size of the light-emitting point (i.e., the light-outputting surface) should be similar to the size of the light-emitting point of the filament lamp, therefore, a radial size of the light guide rod 10 should be as small as possible. At the same time, reducing the radial size of the light guide rod 10 is also beneficial to increase the number of light reflections and improve the uniformity of the light beams. However, when the size of the light guide rod 10 is reduced, the center alignment accuracy of the light guide rod 10 and the light-emitting chip becomes particularly important, otherwise, at least part of the light emitted by the light-emitting chip cannot be collected.

Figure 3:
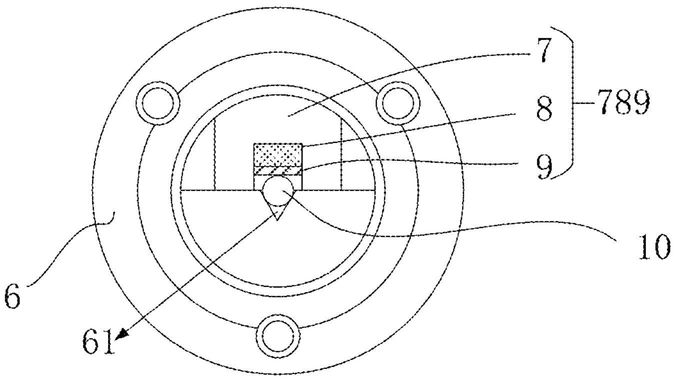
FIG. 3 is a schematic diagram of a radial fixing structure of a light guide rod of a light source device of the present disclosure.

FIG. 3 is a schematic diagram of a radial fixation of a light guide rod of the light source device of the present disclosure, and the schematic diagram is a cross-sectional view perpendicular to the optical axis of the light guide rod 10. With reference to FIG. 1 and FIG. 3, the first positioning member 6 includes a first groove 61 for accommodating the light guide rod 10. The movable fixing assembly 789 squeezes the light guide rod 10 and fixes the light guide rod 10 along the radial direction together with the first groove 61. The movable fixing assembly 789 is movably detachable relative to the first positioning member 6, and deforms when fixing the light guide rod to generate a radial force on the light guide rod 10, thereby further providing an axial friction force for the light guide rod 10 and thus preventing the light guide rod 10 from sliding along the groove 61.

In an embodiment, the light guide rod 10 is a solid light guide rod, and the first light propagates in the light guide rod 10 through total reflection. In order to satisfy the total reflection condition, the first light is prevented from leaking from the side surface of the light guide rod 10. In order to ensure that as little light as possible leaks from the side surface, the movable fixing assembly 789 in an embodiment includes an isolation layer 9, an elastic layer 8, and a rigid layer 7 that are arranged outwards along the radial direction of the light guide rod 10, and the isolation layer 9 is a light reflective layer.

Generally, the elastic structure is usually organic transparent silica gel or light-absorbing rubber. If it is directly in contact with a solid light guide rod, the former will reduce the refractive index difference between the light guide rod and the outside to destroy the total reflection, while the latter will directly absorb light reaching the side surface of the light guide rod, thereby being not conducive to light propagation. Therefore, in the present disclosure, the reflective isolation layer 9 separates the elastic layer 8 from the light guide rod 10, which not only utilizes the force generated by the elastic deformation of the elastic layer 8, but also ensures that the light from the light guide rod 10 does not leak from the side surface. Specifically, the isolation layer 9 can be a steel sheet, an aluminum sheet, a metal paper, or a metal layer, and the elastic layer 8 can be made of silica gel, rubber, or plastic.

The rigid layer 7 is configured to squeeze the elastic layer 8 to increase the force-receiving area, and it can be formed as any suitable shape.

Figure 4:
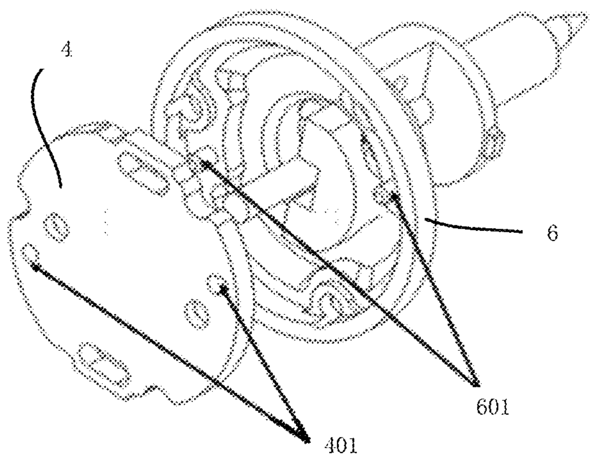
FIG. 4 is a schematic diagram of a partial structure of a light source device of the present disclosure.

FIG. 4 is a schematic diagram of a partial structure of a light source device of the present disclosure. Referring to FIG. 4, the first positioning member 6 and the base plate 4 are directly fixed relative to each other. Specifically, the first positioning member 6 includes a positioning post 601, the base plate 4 includes a positioning hole 401, and the positioning post 601 corresponds to the positioning hole 401, so that the first positioning member 6 is fixedly connected to the base plate 4. Since the first positioning member 6 limits the radial coordinates of the light guide rod 10 through the groove, and the base plate 4 limits the position of the light-emitting chip, the light-emitting chip and the light guide rod 10 are fixed relative to each other in a direction parallel to the light-emitting surface of the light-emitting chip. In other embodiments of the present disclosure, the position of the positioning post and the position of the positioning hole can also be interchanged. For example, the first positioning member includes a positioning hole and the base plate includes a positioning post, and the positioning hole and the positioning hole correspond to each other.

It can be understood that the first fixing member and the base plate can also be indirectly fixed relative to each other through an adapter fixing member, so that the light guide rod and the light-emitting chip are fixed relative to each other along the radial direction of the light guide rod.

In order to limit the radial movement of the light guide rod 10, in an embodiment of the present disclosure, a through hole is provided in the first positioning member, so that the light guide rod 10 passes through the through hole.

<Axial Fixation of Light Guide Rod>

In view of the above, the light guide rod 10 is squeezed by means of the movable fixing assembly and the groove of the first positioning member to generate the static friction that limits the axial movement of the light guide rod 10 to a certain extent. The present disclosure further defines the axial direction of the light guide rod through the following technical solutions.

Figure 5:
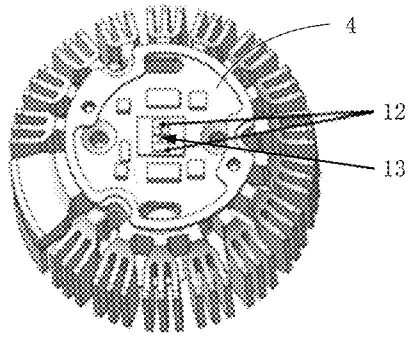
FIG. 5 is a schematic diagram of another partial structure of the present disclosure.
Figure 6:
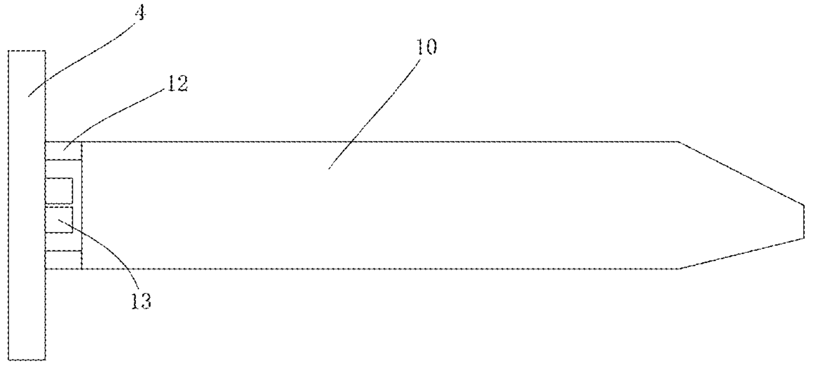
FIG. 6 is another schematic diagram of a light source device of the present disclosure.

FIG. 5 is a schematic diagram of another partial structure of a light source device of the present disclosure, and FIG. 6 is another schematic diagram of the light source device of the present disclosure. Referring to FIG. 5 and FIG. 6, the base plate 4 is also provided with a protective pad 12 (as shown in FIG. 5, there are two protective pads) surrounding the light-emitting chip 13 (as shown in FIG. 5, there are four light-emitting chips). A height of the protective pad 12 relative to the base plate 4 is greater than a height of the light-emitting chip 13 relative to the base plate 4, the light incident end face of the light guide rod 10 is in contact with the protective pad 12, so that it provides a solution to reduce the distance between the light guide rod and the light-emitting chip as much as possible while avoiding a direct contact between the light guide rod 10 and the light-emitting chip 13. On the one hand, a structural stability problem caused by a direct thermal contact between the light-emitting chip and the light guide rod and a mismatch between their coefficients of thermal expansion can be avoided, and on the other hand, a coupling efficiency of light emitted by the light-emitting chip entering the light guide rod is improved.

In an embodiment, the protective pad 12 is a ceramic pad. Specifically, the protective pad 12 can be an alumina ceramic pad. The protective pad 12 and the base plate can be formed into one piece, and more generally, the protective pad 12 is adhered to the base plate 4 later.

The protective pad 12 is connected to the light guide rod 10 by glue, and it is not only configured to prevent the light guide rod 10 from abutting against the light emitting surface of the light-emitting chip 13, but also to provide the axial pulling force for the light guide rod 10 by using the glue, so as to improve the structure reliability.

The glue in the present disclosure can be selected to have a viscosity ranging from 4000 to 10000 to ensure bonding performance. The glue in the present disclosure can be selected to have a curing temperature preferably ranging from 60° C. to 100° C., which roughly corresponds to the working temperature of the light-emitting chip. In this way, the glue can be directly cured with lighting of the light-emitting chip, thereby reducing a step of placing the light source device to be cured in the incubator during the manufacturing process, and thus saving production cost and time cost.

In an embodiment, there are two protective pads 12, and it is understood that in other embodiments, there can be more protective pads, such as four. However, in order to use a light guide rod with a smaller radial size, an overlapping area between the protective pad 12 and the light guide rod is as smaller as possible, as long as a supporting function can be achieved. Therefore, using only two protective pads is a more efficient technical solution choice. In order to improve the combination of the protective pad and the light guide rod while using fewer protective pads, A long side of a cross-section of the protective pad in the present disclosure is arranged close to the light-emitting chip, thereby preventing the protective pad from occupying a light-emitting area of the light-emitting chip and thus obtaining a larger bonding area. When the protective pad has an irregular shape, the long side is a long side of a minimum enclosing rectangle of the protective pad.

The protective pad 12 supports the light guide rod 10, and the relative heights of the protective pad 12 and the light-emitting chip 13 can be adjusted to reduce the distance between the light-emitting surface of the light-emitting chip 13 and the light incident end surface of the light guide rod 10 as much as possible. In an embodiment of the present disclosure, no other optical device (such as a collecting lens) is provided between the light-emitting chip 13 and the light guide rod 10, that is, there is only an air gap therebetween, and the air gap is preferably not larger than 0.05 mm. This technical solution can obtain an excellent light collection efficiency without needing to collimate light, and reduce the lateral loss of light. Conversely, if a collecting lens is provided between the light-emitting chip and the light guide rod, according to the conservation of optical etendue, the light spot will be enlarged while collimating the light beams, as a result, the radial size of the light guide rod will have to be increased, which is disadvantageous to simulation of the final light pattern; or the edge light of the light spot will be unable to enter the light guide rod.

Figure 7:
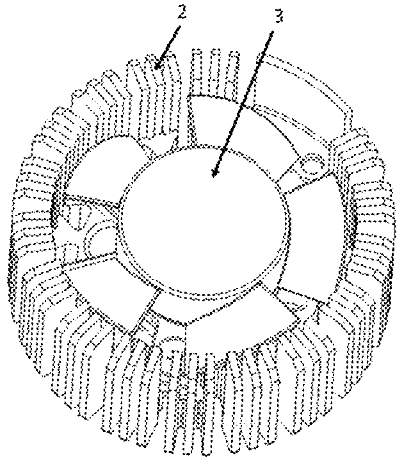
FIG. 7 is a schematic diagram of a heat dissipation assembly of a light source device of the present disclosure.

Referring to FIG. 1 and FIG. 7, the heat dissipation assembly of the light source device of the present disclosure includes a heat radiator 2 and a fan 3. The heat dissipation assembly is arranged on the back of the base plate 4, the heat radiator 2 includes multiple heat dissipation fins arranged in an annular shape, and the fan 3 is arranged at a center of the heat dissipation fins and is surrounded by the heat dissipation fins, and blows airflow along the radial direction to dissipate heat. The heat dissipation component has a compact structure, a small volume, and a very large heat dissipation area.

Referring to FIG. 1 again, the chuck 11 in FIG. 1 is an installation accessory of the light source device. The present disclosure also provides a lamp, and the lamp includes a chuck and the light source device provided by any one of the above embodiments. The chuck is assembled and connected to a lamp housing, and the light source device and the chuck are assembled and connected to each other through the first positioning member, so that the light source device of the present disclosure can be adapted to different application scenarios through the chuck. It only needs to be customized to change the structure of the chuck, so that the light source device has the capability of large-scale and modular production.

The various embodiments in this specification are described in a progressive manner. Each embodiment focuses on the difference from other embodiments, and the same or similar parts between the various embodiments can be referred to each other.

The above merely illustrates some embodiments of the present disclosure, and does not limit the scope of the present disclosure. Any equivalent structure or equivalent process transformation made using the content of the description and drawings of the present disclosure, or directly or indirectly application to other related technical fields in the same way, all fall within the patent protection scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light source device, comprising:

a light-emitting chip arranged on a base plate and configured to emit first light;

a light guide rod comprising a first light guide portion and a second light guide portion, wherein the first light guide portion comprises a light incident end surface, the first light enters the light guide rod through the light incident end surface and is transmitted to the second light guide portion after passing through the first light guide portion, and the second light guide portion comprises a light-outputting surface for outputting light;

a first positioning member comprising a first groove for accommodating the light guide rod, wherein the first positioning member is directly or indirectly fixed relative to the base plate; and a movable fixing assembly, wherein the movable fixing assembly deforms when fixing the light guide rod, wherein at least a part of the light guide rod contacts the first groove along a radial direction of the light guide rod, and at least another part of the light guide rod contacts the movable fixing assembly along the radial direction of the light guide rod, in such a manner that the light guide is fixed by the first groove and the movable fixing assembly along the radial direction of the light guide rod, wherein the movable fixing assembly comprises an elastic layer, and a rigid layer that are sequentially arranged outwards along the radial direction of the light guide rod.

2. The light source device according to claim 1, wherein the isolation layer is a steel sheet, an aluminum sheet, a metal paper, or a metal layer.

3. The light source device according to claim 1, wherein the elastic layer is made of silica gel, rubber, or plastic.

4. The light source device according to claim 1, wherein the first positioning member comprises at least one of a positioning post and a positioning hole, and the base plate comprises at least one of a positioning hole and a positioning post that corresponds to the at least one of the positioning post and the positioning hole of the first positioning member; and the first positioning member and the base plate are fixed relative to each other through the first positioning post and the positioning hole in such a manner that the light-emitting chip and the light guide rod are fixed relative to each other along a direction parallel to a light-emitting surface of the light-emitting chip.

5. The light source device according to claim 1, further comprising:

a protective pad provided on the base plate, wherein the protective pad is arranged at a periphery of the light-emitting chip, a height of the protective pad relative to the base plate is greater than a height of the light-emitting chip relative to the base plate, and the light incident end surface of the light guide rod is in contact with the protective pad.

6. The light source device according to claim 5, wherein the light guide rod and the protective pad are connected to each other by glue.

7. The light source device according to claim 6, wherein the glue has a curing temperature ranging from 60° C. to 100° C.

8. The light source device according to claim 5, wherein the protective pad is a ceramic pad.

9. The light source device according to claim 5, wherein a long side of a cross section of the protective pad is arranged close to the light-emitting chip.

10. The light source device according to claim 5, wherein only an air gap is formed between the light-emitting chip and the light incident end surface, and the air gap is not larger than 0.05 mm.

11. The light source device according to claim 1, wherein the first positioning member further comprises a through hole, through which the light guide rod passes.

12. The light source device according to claim 1, further comprising:

a heat dissipation assembly disposed on a back of the base plate, wherein the heat dissipation assembly comprises a fan and heat dissipation fins surrounding the fan.

13. The light source device according to claim 1, wherein the second light guide portion has cross-sectional areas continuously reducing along a direction of an optical axis, to form a light-outputting surface that is inclined with respect to the optical axis of the light guide rod.

14. The light source device according to claim 13, wherein the light-emitting chip emits white light, and the inclined light-outputting surface of the second light guide portion is provided with a diffuse reflection structure.

15. The light source device according to claim 13, wherein the light-emitting chip is a blue LD, and the light-outputting surface of the second light guide portion is provided with yellow fluorescent material.

16. The light source device according to claim 1, wherein the solid light guide rod is a glass rod, a quartz rod, or a ceramic rod.

17. The light source device according to claim 1, wherein the movable fixing assembly further comprises an isolation layer, the elastic layer is disposed between the isolation layer and the rigid layer along the radial direction of the light guide rod, and the isolation layer is a light reflective layer.

18. The light source device according to claim 1, wherein the light guide rod is a solid light guide rod.

19. A lamp, comprising:

a light-emitting chip arranged on a base plate and configured to emit first light;

a light guide rod comprising a first light guide portion and a second light guide portion, wherein the first light guide portion comprises a light incident end surface, the first light enters the light guide rod through the light incident end surface and is transmitted to the second light guide portion after passing through the first light guide portion, and the second light guide portion comprises a light-outputting surface for outputting light;

a first positioning member comprising a first groove for accommodating the light guide rod, wherein the first positioning member is directly or indirectly fixed relative to the base plate; and a movable fixing assembly configured to fix, together with the groove of the first positioning member, the light guide rod along a radial direction of the light guide rod, wherein the movable fixing assembly deforms when fixing the light guide rod; and a chuck configured to assemble and connect to a lamp housing, wherein the light source device and the chuck are assembled and connected to each other by the first positioning member.

* * * * *